United States Patent [19]

Siebert

[11] Patent Number: 4,764,903
[45] Date of Patent: Aug. 16, 1988

[54] METHOD AND APPARATUS TO DETERMINE PERMEABILITY OF ROCK FORMATIONS ADJACENT A BOREHOLE

[75] Inventor: Robert M. Siebert, Ponca City, Okla.
[73] Assignee: Conoco Inc., Ponca City, Okla.
[21] Appl. No.: 594,194
[22] Filed: Mar. 28, 1984
[51] Int. Cl.$^4$ ............................................. G01V 1/00
[52] U.S. Cl. ...................................... 367/29; 367/30; 364/422; 181/105; 73/151
[58] Field of Search .................. 367/25, 26, 28, 30, 367/31, 32, 29; 181/105; 364/422; 73/152

[56] References Cited

U.S. PATENT DOCUMENTS

| | | | |
|---|---|---|---|
| 3,376,950 | 4/1968 | Grine | 367/28 |
| 3,526,874 | 9/1970 | Schwartz | 367/30 |
| 3,949,352 | 4/1976 | Vogel | 367/31 |
| 3,962,674 | 6/1976 | Howell | 367/30 |
| 4,168,483 | 9/1979 | Parthasarathy et al. | 367/26 |
| 4,172,250 | 10/1979 | Guignard | 367/28 |
| 4,283,953 | 8/1981 | Plona | 367/86 |
| 4,346,460 | 8/1982 | Schuster | 367/27 |
| 4,432,077 | 2/1984 | Alhilali et al. | 367/31 |

OTHER PUBLICATIONS

Rosenbaum, "Synthetic Microseismograms: Logging in Porous Formations", Geophysics, vol. 39, No. 1 (Feb. 1974), pp. 14–32.

Primary Examiner—Thomas H. Tarcza
Assistant Examiner—Daniel T. Pihulic

[57] ABSTRACT

A method and apparatus for determination of earth formation permeability in situ. A logging sonde supported in a borehole derives attenuation data from at least two ultrasonic energy transmission paths which have a common alignment but differing length, the attenuation data can then be used to determine an empirical X parameter that is directly related to formation permeability.

4 Claims, 4 Drawing Sheets

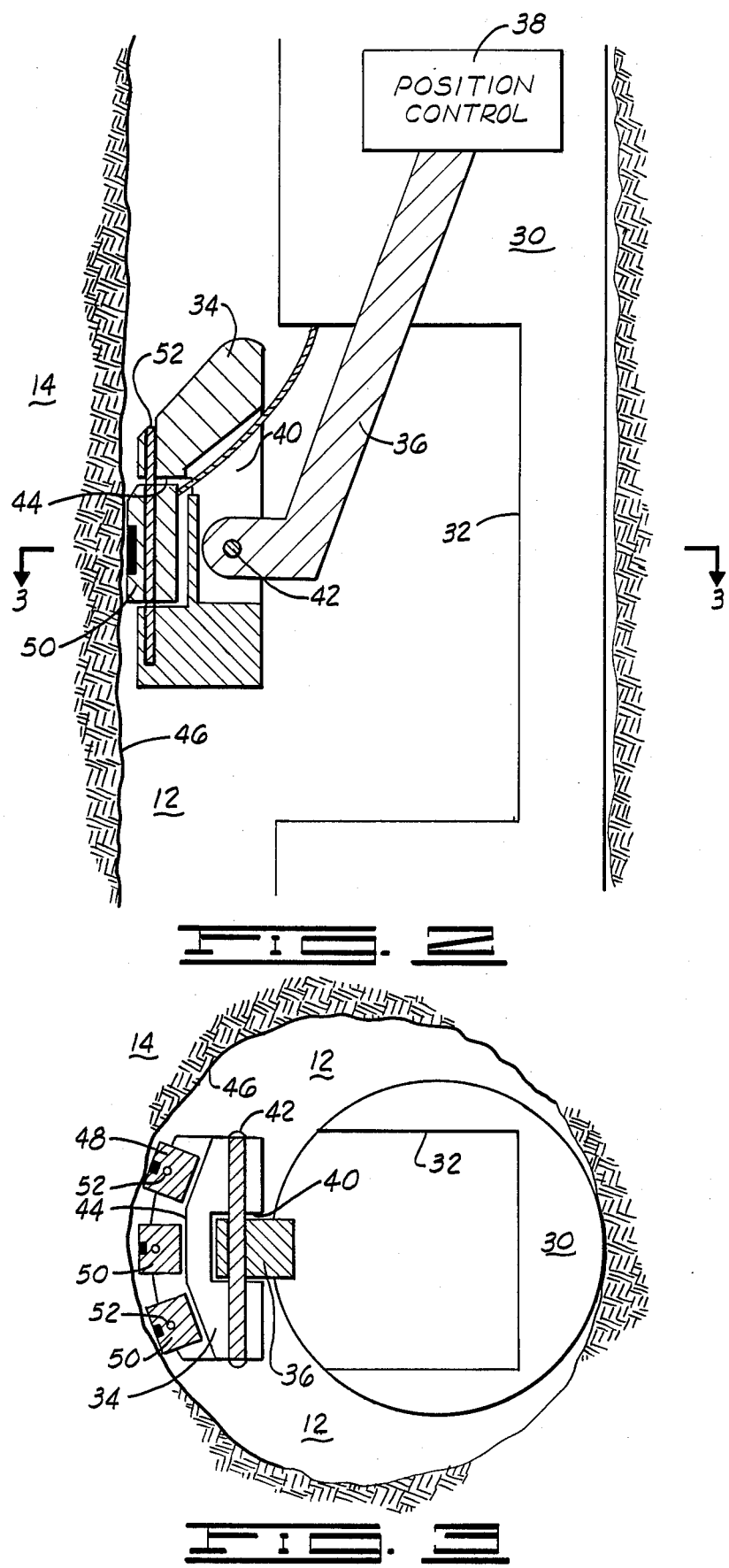

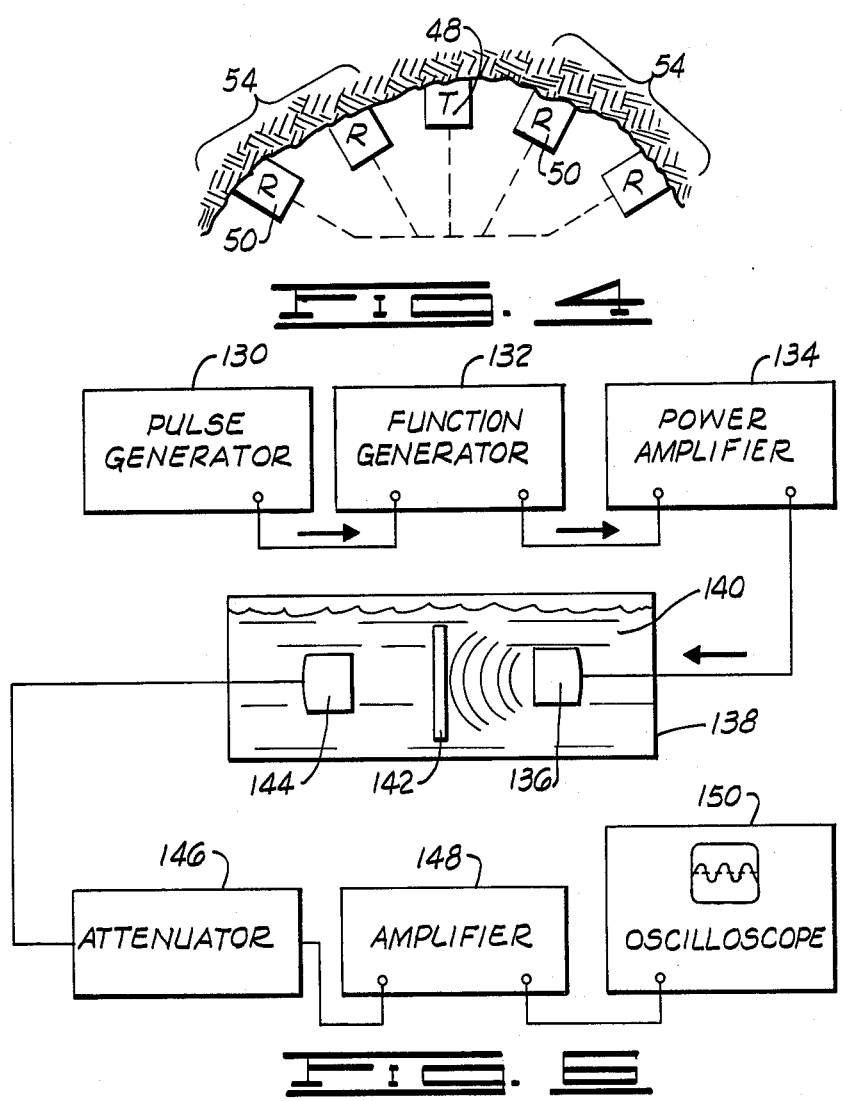
FIG. 4
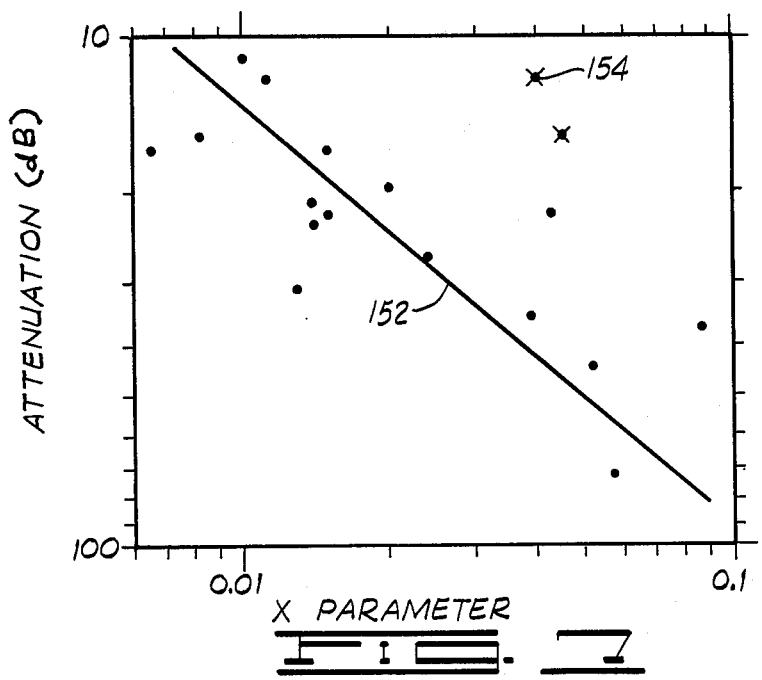
FIG. 5
FIG. 6

METHOD AND APPARATUS TO DETERMINE PERMEABILITY OF ROCK FORMATIONS ADJACENT A BOREHOLE

BACKGROUND OF THE INVENTION

1. Field of the Invention

The invention relates generally to borehole logging devices and, more particularly, but not by way of limitation, it relates to a logging sonde that utilizes high frequency acoustic energy to develop an indication of rock permeability for strata adjacent a borehole.

2. Description of the Prior Art

Previous attempts have been made at deriving permeability information from an acoustic energy borehole tool, and such prior systems generally relied upon detection of back-scattered acoustic energy to derive a meaningful indication. One patent of interest is the published United Kingdom patent application No. 2034888A in the name of Plona which involves the injection of a broad-band ultrasonic pulse containing 0.2 to 7.5 MHz frequencies into a subsurface formation and thereafter detecting the back-scattered acoustic energy. The back-scattered signal is then spectrally analyzed to give attenuation versus frequency data which is then equated to a grain size data or so called granularity property. This method assumes that there is an essential correlation of the attenuation of sandstone with its grain size, but certain experimental attenuation versus frequency data obtained by conventional transmission methods indicate that this may not be true.

Another prior art approach to the use of acoustic attenuation to obtain permeabilities involves Biot's theory of wave propagation in fluid-filled, porous solids. The extra increment of acoustic attenuation due to relative motion between the pore fluid and solid matrix is proposed as a measure of a formation's permeability. This method has been developed by Rosenbaum, 1974, *Geophysics*, Volume 39, No. 1, pp. 14–32. In general, frequencies used in application of the Rosenbaum method are lower than those used in the present invention and the dominant mechanism of attenuation is also different. Still other approaches utilize low frequency acoustic energy to generate and analyze tube wave data for borehole correlation as to permeability, e.g. U.S. Pat. No. 4,432,077.

Finally, U.S. Pat. No. 4,168,483 in the name of Parthasarathy describes a system for deriving data indicative of microfracture density in earth substructure adjacent to a borehole. Here again, the system analyzes back-scattered energy, i.e. energy reflected by the microfractures of the earth structure. The invention is directed toward the determination of permeability and this must be presumed to be the contribution of microfractures to the formations permeability since there is no mention of the rocks matrix permeability, measurement of which is the aim of the present invention.

SUMMARY OF THE INVENTION

The present invention relates to a method and apparatus for the direct determination of permeability of rock formations adjacent a borehole. The method utilizes transmission of very high ultrasonic frequency energy with reception of the transmitted energy for subsequent analysis as to transmission signal attenuation for calculation of an X parameter. The X parameter is complex in that it contains a measure of the rock pore sizes, pore size distribution, pore and grain shapes, mineralogic composition, etc., and the X parameter is used to calculate permeability in an empirical equation which also utilizes log derived porosity and other variables.

The measuring apparatus may consist of such as three independent, piezoelectric transducers, a transmitter and at least two aligned receiver crystals, which are firmly pressed against the borehole wall. The transmitter is then pulsed with high frequency acoustic energy and the received energy is comparatively processed as the rock attenuation is measured by taking the electronically processed difference between the peak signal amplitudes at the two receivers to derive a transmission loss or attenuation quotient.

Therefore, it is an object of the present invention to provide a logging apparatus for deriving an accurate permeability measurement in situ.

It is also an object of the present invention to provide a downhole permeability device that obviates the need for some core analysis procedures other than for a generalized section of terrain.

It is yet further an object to obtain an energy attenuation measurement that yields a parameter that is more directly related to formation permeability.

It is also an object of the invention to provide a downhole sonde and comparison circuitry that is relatively simple yet highly reliable in determination of earth formation permeabilities.

Finally, it is an object of the present invention to provide a device utilizing a measure of transmitted acoustic energy attenuation in determination of a more accurate permeability quotient for formations adjacent a borehole.

Other objects and advantages of the invention will be evidenced from the following detailed description when read in conjunction with the accompanying drawings which illustrate the invention.

BRIEF DESCRIPTION OF THE DRAWINGS

FIG. 2 is a generally schematic side view in vertical section of a borehole sonde constructed in accordance with the present invention;

FIG. 4 is an alternative form of plural receiver/transmitter array that may be utilized in the present invention;

FIG. 5 is a block diagram of the sonde control equipment including comparison processing circuitry;

FIG. 6 is a block diagram of laboratory test apparatus utilized to establish proof of permeability determination in accordance with the present invention; and FIG. 7 is a graph of the X parameter versus attenuation through a given test specimen as developed with the apparatus of FIG. 6.

DETAILED DESCRIPTION OF THE INVENTION

The method of the present invention entails the measurement of formation acoustic energy attenuation in order to determine a value of a complex X parameter. This X parameter is then used to calculate the formation permeability. Attenuation is measured by injecting an acoustic pulse or tone burst into the rock by a transmitter transducer and receiving the attenuated pulse at two or more receiver transducers for processing and determination of the X parameter. The method differs in that it uses a single ultrasonic frequency, or at least a very narrow band of frequencies. It measures attenuation by direct transmission of the acoustic pulse rather than by detection of back-scattered energy, and it yields a non-specific parameter that is more directly related to permeability. Also, the device of the present invention operates at very high ultrasonic frequencies where one mode or mechanism of attenuation, i.e. scattering, dominates, thus simplifying the correlation of attenuation data to permeability.

Figure 1A:
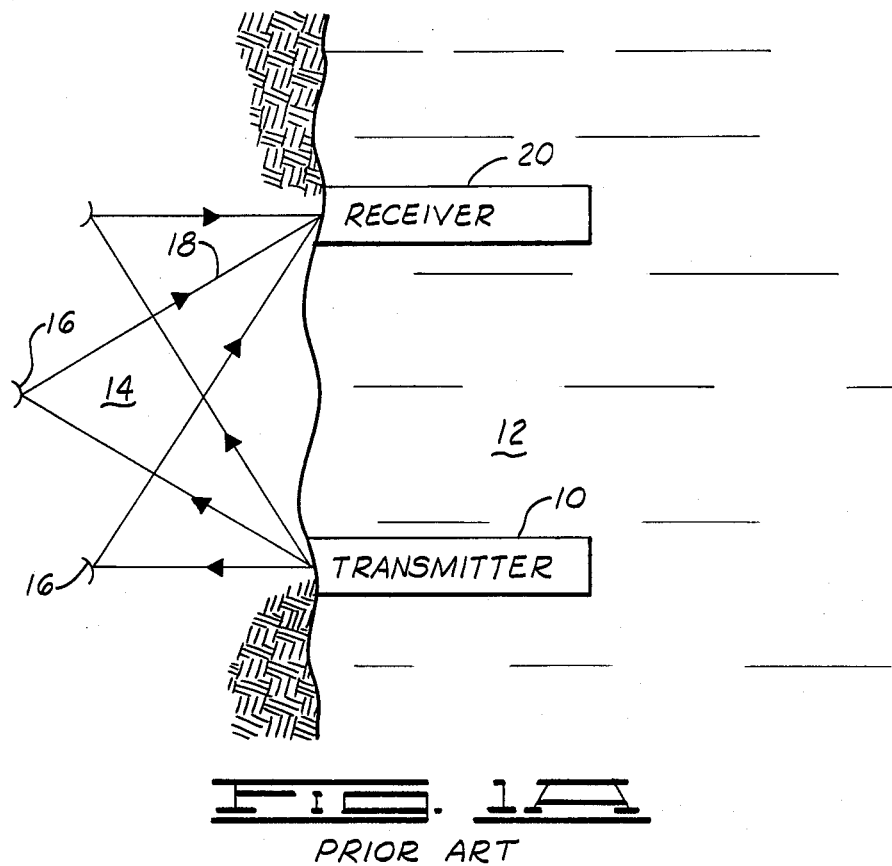
FIG. 1A is an idealized view illustrating transmission of back-scattered acoustic energy in a manner utilized in prior art permeability sensing schemes.
Figure 1B:
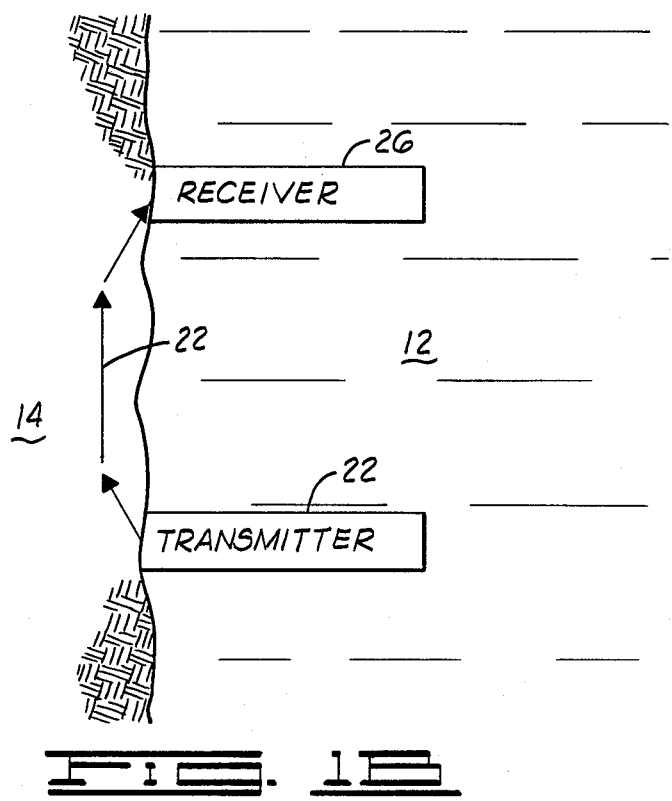
FIG. 1B is an idealized diagram illustrating direct transmission of acoustic energy in a formation adjacent a borehole.

FIG. 1A illustrates the transmission mode of prior art developments wherein transmitter 10 within borehole 12 directs acoustic energy into borehole wall formation 14. The transmitted acoustic energy is then back-scattered by inelastic collisions at scatter points 16 whereupon back-scattered energy along paths 18 can be sensed at receiver 20 after direct path energy for subsequent processing to derive some form of permeability quotient. In accordance with the present invention, as shown in FIG. 1B, the transmitter 20 transmits acoustic energy via path 22 for direct path transmission to receiver 26. The signal pulse 22 is transmitted directly into the formation 14 for propagation along the formation borehole interface between the transmitter 22 and receiver 26. The pulse transmitted may be either a tuned, i.e. one frequency, tone burst of two or more sine-wave cycles or the pulse may be a broad-banded pulse whose energy is mostly in a relatively narrow band, e.g. one to two Megahertz. The frequency of tone bursts or pulse may be selectively varied in order to best fit a formation's characteristics and such that the dominant mechanism of attenuation is scattering, i.e. as opposed to Biot's mechanism. This center frequency for a broad-band pulse or the frequency of a tone burst may be somewhere between 0.1 and 10.0 MHz.

The attenuation of a formation is used to calculate a complex X parameter which in turn is then used to calculate permeability. The general form of an empirical equation that may be used is as follows:

$$f(X) = K \cdot f(\alpha) \tag{1}$$

then for determination of permeability in millidarcies (k) it follows that:

$$k = C \cdot f(X) \cdot F(\phi) \cdot f(Y) \tag{2}$$

where selected parameters are as follows:
X is the complex ultrasonic parameter,
K is a constant,
$\alpha$ is the formations acoustic attenuation in decibels per centimeter,
C is a constant,
$\phi$ is the formations porosity in percent, and
Y is a complex parameter which is composed of functions involving other readily measured parameters for the borehole (e.g. formation factor, gamma ray count, etc.).

The X parameter is an undifferentiated variable and it is believed to be influenced by mean grain and pore sizes, size distributions, grain shape, mineralogical composition, pore fluid composition and the like. Such porosities and other variables that may be required in equation (2) can be obtained by other geophysical logging tools that are well-known and available in the field.

Figure 3:
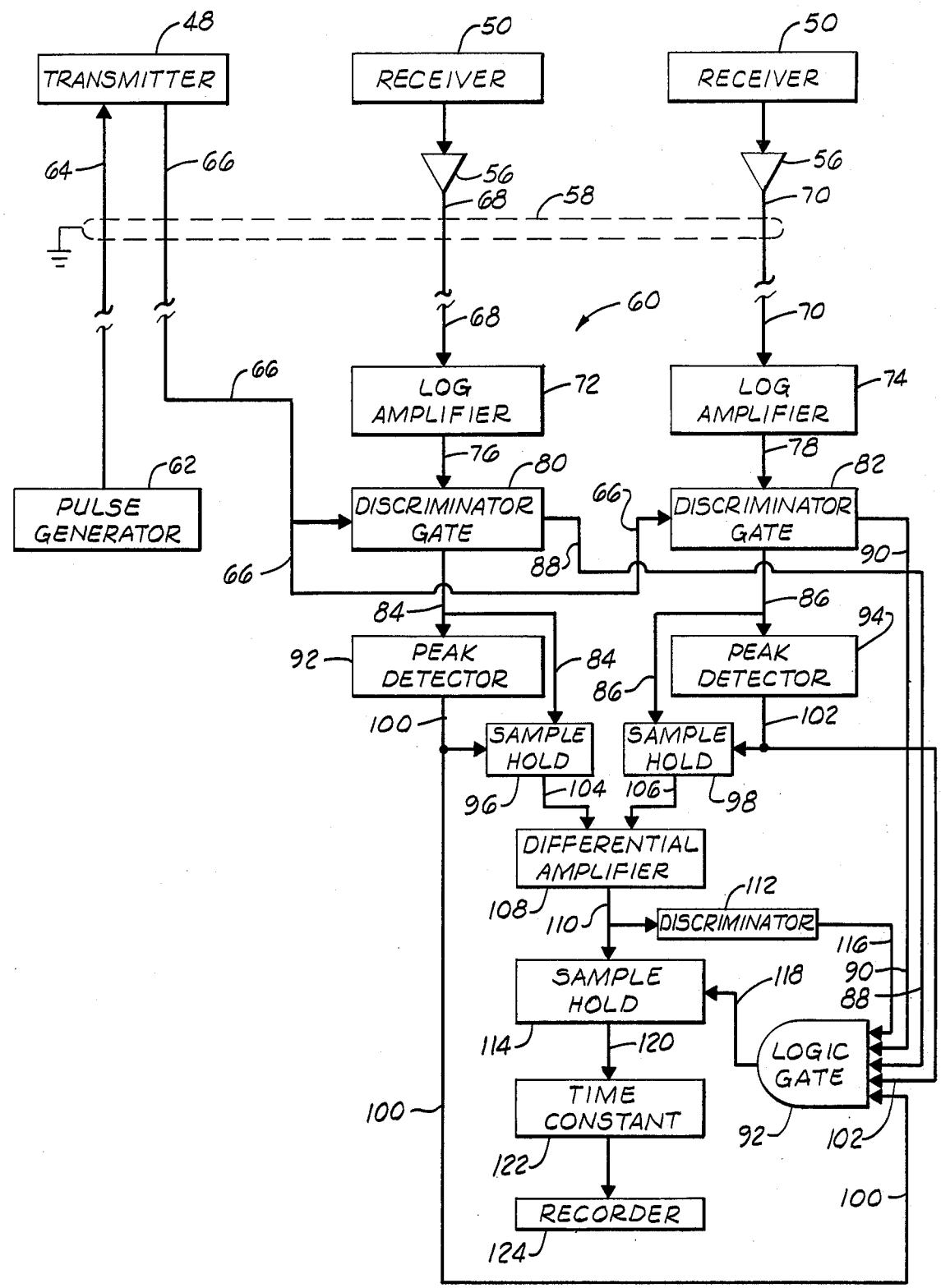
FIG. 3 is a schematic depiction of a horizontal section through lines 3—3 of FIG. 2.

Referring to FIGS. 2 and 3, a borehole logging side 30 is supported in the borehole 12 by movable cable in the manner of conventional cable tool practice. The sonde 30 includes a suitable recess 32 providing protective housing for a sonde head 34 extensibly supported on a pivot arm 36 that is actuatable in response to a suitable position control 38. The pivot arm 36 is pivotably connected to sonde head 34 within a recess 40 by means of a pivot pin 42. The position control 38 may be a conventional form of hydraulically actuated extensor assembly as contained in sonde 30 and electrically actuated from a surface position.

The sonde head 34 also includes a generally arcuate front recess 44 for housing a plurality of transducers to be securely pressed through mudcake or whatever into firm contact with borehole wall 36. The transducers may be a combination of transducers such as a transmitting transducer 48 and one or more spaced receiver transducers 50 aligned therewith. The transducers may be the conventional form of electrically pulsed transducer, e.g. a piezoelectric type transducer, and a type which is rated for very high ultrasonic frequencies on the order of 0.1 MHz up to 10 MHz. Each of transducers 48 and 50 is pivotably secured by a vertical securing rod 52 press fit or the like down through sonde head 34 across front recess 44.

In such a transducer array, an end transducer 48 is used to transmit the pulse which is received by the other two aligned transducers 50. The formations attenuation quotient is the difference in the received peak amplitudes of the pulse as between the two receiving transducers 50 divided by the receivers distance of separation. Two or more receiver transducers 50 may be used in order to remove or subtract from the pulse amplitudes the effect of varying acoustic coupling efficiencies between the transduces and the borehole wall. The line of transducers may be oriented either horizontally or vertically depending on whether horizontal or vertical permeabilities are sought and, as shown in FIG. 4, the line of transducers can be extended to two sets 54 of two receiver transducers 50, one set 54 on either side of the transmitter transducer 48. The use of plural sets of receivers allows acquisition of independent attenuation data multiples for comparison or averaging in the final processing.

FIG. 5 illustrates circuitry for permeability determination. The processing of received acoustic signals entails amplification, discrimination of out-of-bounds or bad signals, detection of the appropriate signal peak, sampling of the appropriate peak, and finally, subtracting the resulting signals. The transmitter transducer 48 and receiver transducers 50 as well as various preamplifiers 56 are located downhole in the sonde 30 and these are connected by a plurality of conduits of a logging cable 58 to a surface located control circuit 60. At the surface, a suitable pulse generator 62 provides pulsing energy downhole via conduit 64 to periodically energize the transmitter transducer 48. A transmitter reset pulse is then periodically transmitted uphole via conduit 66 for application in the control circuit 60 as will be further described. Received energy output from receiver transducers 50 as preamplified is conducted uphole by conduits 68 and 70. The preamplifier may also include filtering thereby to pass only frequencies of interest.

Receiver signals on conduits 68 and 70 are applied to respective log amplifiers 72 and 74 whereupon the signal indication is amplified and then converted to a logarithmic form for output on lines 76 and 78. If desired, the respective log amplifiers 72, 74 may also be located downhole to provide greater amplification prior to transmission of the received data upward over the long conduits 68 and 70.

Received signal outputs in log form on leads 76 and 78 are then applied to respective discriminator gates 80 and 82 for detection of any out-of-bounds signals. Discriminator gates 80 and 82 are each gated on by transmitter reset signal on line 66 for a selected time duration and the discriminator gates limit output on lines 84 and 86 to such time windows in order to eliminate spurious signals and high amplitude noise. Discriminator gates 80 and 82 also provide a gate output via lines 88 and 90 for input to a logic gate 92 which functions to inhibit the taking of a data point if such an out-of-bounds signal is detected. Thus, only the wanted or good output signals are routed via lines 84 and 86 to respective peak detectors 92, 94 and in parallel to sample and hold circuits 96, 98.

Output from respective peak detectors 92 and 94 is via leads 100 and 102 for application both as input to respective sample and hold circuits 96 and 98 and also for input to the logic gate 92. The peak detectors 92, 94 locate a selected or appropriate signal peak as output on 100, 102 to enable respective sample and hold circuits 96, 98 to specifically sample the selected peak. Resulting sampled peak output signals on leads 104 and 106 are then subtracted in a differential amplifier 108. Differential output on line 110 is applied in parallel to a discriminator circuit 112 and a final sample and hold circuit 114. The final discriminator 112 once again limits as to any remaining out-of-bounds signals and provides output on line 116 to logic gate 92 thereby to enable or inhibit the taking of a data point via output on line 118 to the sample and hold circuit 114. The final sample and hold circuit 114, as enabled by logic gate 92, samples the output signal and any output on line 120 is then smoothed or averaged by a time constant circuit 122 with output to a selcted form of data recorder 124.

The correlation between a rock's acoustic attenuation and it's permeability may be demonstrated experimentally. The absolute attenuation at one Megahertz of eighteen sandstone samples was measured by a simple transmission method that was carried out by the apparatus shown generally in FIG. 6. Thus, a pulse generator 130 provides input to a function generator 132 and final output through a power amplifier 134 to drive a transmitting transducer 136. The transmitting transducer 136 is immersed in a vessel 138 containing coupling fluid or water 140, and a selected sample or specimen 142 and receiving transducer 144 are also aligned within water 140 at known spacing. Received transmission output from receiver 144 is then applied through an attenuator 146 and amplifier 148 for visual display on an oscilloscope 150.

In the experimental procedure, amplitude measurements at 1 MHz were made on two sandstone slabs or specimens 142 of different thicknesses but cut from the same sample. The attenuation is then the difference of received amplitude for the two specimens as divided by the difference in thicknesses. The exact equations used for the correlation are:

$$\log X = K \cdot \log \alpha + \log a. \tag{3}$$

and $$k = X^2 \cdot \phi^{5/3} \cdot (\phi - 5)^{10/3} \tag{4}$$

where a is a constant, i.e. intercept, and 'f(Y) and C from equation (2) are set equal to one. Equation (4) may be used to calculate values of X for the permeability and porosity data available for the particular specimens. The values of absolute attenuation were plotted against their respective X parameter value as shown in FIG. 7. The plotted data show a moderately good correlation between the sandstone's attenuation and its X parameter. The straight line 152 and correlation coefficient in FIG. 7 were obtained by least squares fit, and two cross-marked data points 154 were not included in the fit because sample heterogeneity precluded measurement of good attenuations. Working all calculations in reverse, the experimental attenuations were used to calculate an X parameter value using the line 152, i.e. calculating the X parameter as would be the case in practical use of the logging tool. Thus, in the experimental procedure, the X parameter value derived from line 152 was used in the equation (4) to calculate the sample permeability. The calculated permeabilities were within a factor of two of the measured permeabilities for seventy percent of all specimens tested.

The foregoing discloses a novel method and apparatus for determining rock formation permeability in situ. There is disclosed a novel cable logging tool which reliably obtains permeability data readings for rock formations adjacent a borehole. The device of the present invention obtains ultrasonic energy attenuation measurements that yield a parameter that is more directly related to the permeability of a formation; and, the method is easier to implement from an electronic standpoint because the tuned or narrow band electronics will allow greater signal strength as well as higher signal-to-electronic noise ratio, while effectively eliminating all acoustic noise at frequencies outside of the reception band width.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. Apparatus for determining permeability of earth formations adjacent a borehole, comprising:

pulse generator means for generating a drive frequency pulse having a frequency in the range of 0.1 MHz to 10 MHz and having a bandwidth limited to about 2 MHz;

first transducer means coupled to said pulse generator firmly engaged with the borehole wall to transmit high frequency acoustic energy directly into the borehole wall in the frequency range of 0.1 MHz to 10 MHz and having a bandwidth limited to about 2 MHz;

second and third transducer means responsive to energy in the frequency range of 0.1 MHz to 10 MHz and being firmly engaged with the borehole wall and disposed at known spacing in alignment with said first transducer means, and directly receiving said transmitted acoustic energy to produce first and second outputs indicating attenuation of the acoustic energy between the second and third transducer means;

first and second discriminator means receiving said first and second outputs and producing first and second amplitude limited outputs and first and second gate outputs, said first and second discriminator means being enabled when said first transducer means transmits acoustic energy;

first and second peak detector means receiving said first and second amplitude limited outputs to generate respective first and second enabling outputs;

first and second sample and hold means receiving said first and second amplitude limited outputs and enabled by said first and second enabling outputs to output first and second peak signal outputs;

differential amplifier means receiving input of said first and second peak signal outputs to generate a different signal;

third sample and hold means sampling said difference signal when enabled to produce a sampled output;

third discriminator means receiving said difference signal and generating a logic enable signal;

logic gate means enabling said third sample and hold means upon coincident input of said enable signal, said first and second enabling outputs and said first and second gate outputs;

smoothing means receiving said sampled output to produce sampled and smoothed signal outputs; and means displaying said successive sampled and smoothed signal outputs as an indication of formation permeability along said borehole.

2. Apparatus as set forth in claim 1 wherein said first and second discriminator means further comprise:

first and second logarithmic amplifiers receiving said first and second outputs to produce first and second log outputs;

first and second discriminator gate means enabled by a reset pulse synchronous with transmitted energization to output said first and second amplitude limited outputs during selected time windows.

3. Apparatus as set forth in claim 1 which further includes:

sonde frame means for movable suspension along said borehole;

head means pivotally supported by said sonde frame means, said head means further supporting each of said first, second and third transducer means in known spaced alignment; and means actuatable to extend said head means thereby firmly to engage each of said transducer means with the borehole wall.

4. The apparatus of claim 1 wherein said frequency generator generates a single ultrasonic frequency.

* * * * *